(12) United States Patent
Michelis et al.

(10) Patent No.: US 11,138,230 B2
(45) Date of Patent: Oct. 5, 2021

(54) METHODS, APPARATUS, AND SYSTEMS TO AGGREGATE PARTITIONED COMPUTER DATABASE DATA

(71) Applicant: McAfee, LLC, Santa Clara, CA (US)

(72) Inventors: Pablo A. Michelis, San Jose, CA (US); Brian H. Stewart, Smithfield, UT (US)

(73) Assignee: McAfee, LLC, San Jose, CA (US)

( * ) Notice: Subject to any disclaimer, the term of this patent is extended or adjusted under 35 U.S.C. 154(b) by 180 days.

(21) Appl. No.: 15/935,746

(22) Filed: Mar. 26, 2018

(65) Prior Publication Data
US 2019/0294724 A1 Sep. 26, 2019

(51) Int. Cl.
| | |
|---|---|
| *G06F 16/00* | (2019.01) |
| *G06F 16/27* | (2019.01) |
| *G06F 16/22* | (2019.01) |
| *G06F 16/2458* | (2019.01) |
| *G06F 16/2455* | (2019.01) |
| *G06F 16/2453* | (2019.01) |

(52) U.S. Cl.
CPC ........ *G06F 16/278* (2019.01); *G06F 16/2282* (2019.01); *G06F 16/2471* (2019.01); *G06F 16/24534* (2019.01); *G06F 16/24542* (2019.01); *G06F 16/24554* (2019.01)

(58) Field of Classification Search
CPC .... G06F 16/2456; G06F 16/289; G06F 16/27; G06F 16/2471; G06F 16/2246; G06F 16/24542; G06F 16/2282; G06F 16/24532; G06F 16/90335; G06F 16/24539; G06F 16/24552; G06F 16/278; G06F 16/24528
See application file for complete search history.

(56) References Cited

U.S. PATENT DOCUMENTS

| | | | | |
|---|---|---|---|---|
| 5,745,746 | A | * | 4/1998 | Jhingran ........... G06F 16/24532 |
| 6,092,062 | A | * | 7/2000 | Lohman ............ G06F 16/24542 |
| 6,405,198 | B1 | * | 6/2002 | Bitar ................... G06F 16/2282 |

(Continued)

FOREIGN PATENT DOCUMENTS

| | | | |
|---|---|---|---|
| CN | 112204541 | | 1/2021 |
| GB | 2521197 A | * | 6/2015 |

(Continued)

OTHER PUBLICATIONS

Xiao Zongshui et al., "Global Index Oriented Non-shard Key for Multi-Tenant Database", IEEE International Conference on Computer and Information Technology; Ubiquitous Computing and CommunicationsDependable, Autonomic and Secure Computing; Pervasive Intelligence and Computing, 2015, pp. 831-836.*

(Continued)

*Primary Examiner* — Srirama Channavajjala
(74) *Attorney, Agent, or Firm* — Hanley, Flight & Zimmerman, LLC

(57) ABSTRACT

Methods, apparatus, systems and articles of manufacture are disclosed. An example partitioned computer database system includes a plurality of nodes, a data director to distribute a plurality of portions of database data across the plurality of nodes, queriers associated with respective ones of the plurality of nodes, the queriers to execute respective sub-queries of respective portions of the database data, and a coordinator to receive a request to query the database data, and merge results of the plurality of sub-queries to form a response to the request.

17 Claims, 5 Drawing Sheets

(56) References Cited

U.S. PATENT DOCUMENTS

| | | | | |
|---|---|---|---|---|
| 6,795,817 | B2* | 9/2004 | Agarwal | G06F 16/24532 |
| 7,805,456 | B2* | 9/2010 | Meijer | G06F 16/2438 |
| | | | | 707/759 |
| 8,655,901 | B1* | 2/2014 | Li | G06F 16/951 |
| | | | | 707/760 |
| 9,471,647 | B2* | 10/2016 | Bent | G06F 16/2471 |
| 9,563,663 | B2* | 2/2017 | Shukla | B29D 30/0681 |
| 2003/0088558 | A1* | 5/2003 | Zaharioudakis | G06F 16/24539 |
| 2004/0088386 | A1* | 5/2004 | Aggarwal | G06F 11/3495 |
| | | | | 709/220 |
| 2004/0220911 | A1* | 11/2004 | Zuzarte | G06F 16/90335 |
| 2005/0027680 | A1* | 2/2005 | Yagawa | G06F 16/25 |
| 2005/0187977 | A1 | 8/2005 | Frost | |
| 2006/0041537 | A1* | 2/2006 | Ahmed | G06F 16/90324 |
| 2006/0294087 | A1* | 12/2006 | Mordvinov | G06F 16/24528 |
| 2007/0226177 | A1* | 9/2007 | Barsness | G06F 16/2282 |
| 2008/0040317 | A1* | 2/2008 | Dettinger | G06F 16/24534 |
| 2008/0059408 | A1* | 3/2008 | Barsness | G06F 16/90335 |
| 2008/0177716 | A1* | 7/2008 | Hejlsberg | G06F 16/24552 |
| 2011/0131199 | A1* | 6/2011 | Simon | G06F 16/24542 |
| | | | | 707/714 |
| 2012/0310916 | A1* | 12/2012 | Abadi | G06F 16/24542 |
| | | | | 707/713 |
| 2013/0311441 | A1* | 11/2013 | Erdogan | G06F 16/2282 |
| | | | | 707/713 |
| 2014/0067792 | A1 | 3/2014 | Erdogan et al. | |
| 2014/0172914 | A1* | 6/2014 | Elnikety | G06F 16/9024 |
| | | | | 707/774 |
| 2015/0081666 | A1* | 3/2015 | Long | G06F 16/2453 |
| | | | | 707/713 |
| 2016/0117369 | A1 | 4/2016 | Bent et al. | |
| 2016/0188677 | A1 | 6/2016 | Murthy et al. | |
| 2016/0191509 | A1* | 6/2016 | Bestler | G06F 12/1408 |
| | | | | 713/163 |
| 2017/0103116 | A1* | 4/2017 | Hu | G06F 16/217 |
| 2017/0346875 | A1* | 11/2017 | Wells | G06F 9/5033 |
| 2018/0060385 | A1 | 3/2018 | Xiao et al. | |

FOREIGN PATENT DOCUMENTS

| | | | |
|---|---|---|---|
| WO | WO2017062288 A1 * | 4/2017 | |
| WO | WO2017208221 A1 * | 12/2017 | |

OTHER PUBLICATIONS

Patent Cooperation Treaty, "Search Report," issued in connection with the International Patent Application No. PCT/US2019/023877, dated Jul. 3, 2019, 3 pages.

International Searching Authority, "Written Opinion," issued in connection with the International Patent Application No. PCT/US2019/023877, dated Jul. 2, 2019, 6 pages.

International Searching Authority, "International Preliminary Report on Patentability and Written opinion," issued in connection with International Patent Application No. PCT-US2019/023877, dated Sep. 29, 2020, 7 pages.

* cited by examiner

METHODS, APPARATUS, AND SYSTEMS TO AGGREGATE PARTITIONED COMPUTER DATABASE DATA

FIELD OF THE DISCLOSURE

This disclosure relates generally to databases, and, more particularly, to methods, apparatus and systems to aggregate partitioned computer database data.

BACKGROUND

Data driven security applies big data analytics to security data streams. Security data streams may be generated by collecting data coming from large numbers of machines distributed across large-scale customer systems.

Figure 1:
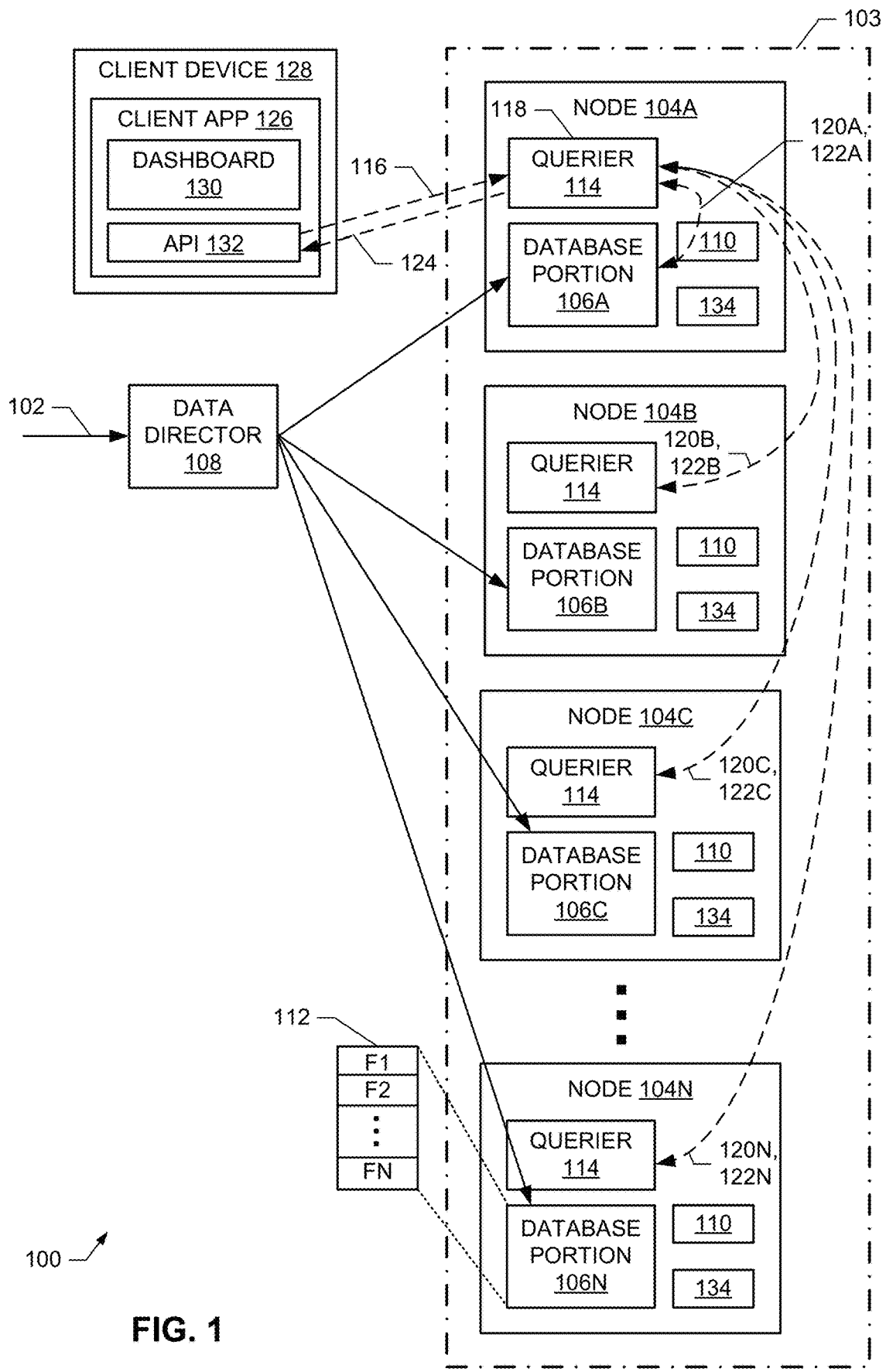
FIG. 1 illustrates an example system in which partitioned database data may be scalably aggregated, according to teachings of this disclosure.

When useful, the same reference numbers will be used in the drawing(s) and accompanying written description to refer to the same or like parts. Connecting lines or connectors shown in the various figures presented are intended to represent example functional relationships and/or physical or logical couplings between the various elements.

DETAILED DESCRIPTION

In the field of computer security information and event management (SIEM), security operations center analysts need to be able to interactively control data stream aggregation, and filtering to identify data stream properties that might otherwise remain unobserved. However, as customer deployments have grown to cloud scale, security data streams have become so large (e.g., hundreds of millions of events) that stream ingestion and aggregation can no longer be handled by a single database node. Accordingly, systems, methods and apparatus that scale beyond the existing limits of a single node are disclosed herein. Some examples disclosed herein scale stream data ingestion by partitioning (e.g., spreading, distributing) the stream data across a plurality of nodes, as the stream data is received and ingested (i.e., in substantially real-time).

In known large systems, data that has been partitioned in that way across a plurality of nodes cannot be joined without data re-shuffle (e.g., aggregated, combined, etc.). For example, given two tables R and S, R JOIN S is the set of all combinations of tuples in R and S that have common attribute names. Consider example common attributes that are the subset of fields K. To compute R JOIN S, the database system must take each row r in R and find all the tuples s in S where r.k=s.k. To compute this in a distributed system, where both R and S are distributed, each physical node in the cluster must provide the data from either S or R to the other nodes, which can then do a local merge. A local merge between R and P(S) is that each r in R is compared with all the rows in P(S) to ensure a total Cartesian product is determined for the JOIN. The providing of the data between nodes is known as re-shuffling, and makes a real-time JOIN not feasible on a known distributed systems. In contrast, according to teachings of this disclosure, the partitioned data can be scalably filtered, joined and aggregated in real-time, across the plurality of nodes without re-shuffling. Currently-available, expensive and complex systems are only capable of processing approximately one million events-per-second (EPS). In stark contrast, the teachings of this disclosure have been used to demonstrate systems that are capable of over two million EPS. As EPS is an important benchmark in the field of SIEM, a 2× improvement in EPS represents a significant improvement in database systems, apparatus and methods for SIEM. Such improvements allow SIEM analysts the ability to more quickly detect security events and respond to mitigate them in the computer systems they are monitoring, thereby lessening chances of, for example, data loss, data theft, computer system unavailability, etc.

Reference will now be made in detail to non-limiting examples, some of which are illustrated in the accompanying drawings.

FIG. 1 illustrates an example partitioned database system 100 in which database data 102 (e.g., security event data for a SIEM system) may be scalably partitioned, in real-time, across a cluster 103 of nodes 104A, 104B, 1040, . . . 104N. An example node 104A-N is a computer system (e.g., a server, a workstation, etc.) having one or more non-transitory storage device or storage disk for storing database data. The database data 102 is partitioned into portions 106A, 106B, 106C, . . . 106N of the database data 102 that are stored on the nodes 104A-N. The database data 102 stored in the portions 106A-N may be subsequently aggregated (e.g., combined, merged, etc.), in real-time, according to teachings of this disclosure. In some examples, the portions 106A-N are stored on different nodes 104A-N. Additionally, and/or alternatively, a portion 106A-N may be stored on multiple nodes 104A-N for redundancy, multiple portions 106A-N may be stored on a node 104A-N, etc.

To partition the database data 102 into the portions 106A-N, the example system 100 of FIG. 1 includes an example data director 108. As the database data 102 is received in real-time, the example data director 108 directs the database data 102 (e.g., distributes, spreads, etc.) to the portions 106A-N according to, for example, a pattern not depending on data content. Example patterns include a random distribution, a rotating distribution, a round robin distribution, etc. In some examples, the same data is stored in multiple portions 106A-N. Because the distribution of the database data 102 can spread the database data 102 evenly (e.g., substantially evenly) across the nodes 104A-N, bottlenecks can be avoided, and the database data 102 can be partitioned at a high rate, e.g., over two million EPS.

In the illustrated example of FIG. 1, the database data 102 is segmented into dimensions and facts. Facts contain references (e.g., keys, pointers, etc.) to one or more dimensions. In the example of FIG. 1, the dimensions are stored in a dimension table 110 that is replicated on each node 104A-N. Example dimensions include rules that are used to trigger an alert, the descriptions or properties of rules, etc.

In the illustrated example of FIG. 1, the portions 106A-N store database data in a fact table (one of which is designated at reference numeral 112) containing example facts F1, F2, . . . FN. The example facts F1-FN are stored in separate rows of the fact table 112 (e.g., horizontally arranged, horizontally partitioned, etc.). The other portions 106A-M likewise store the same or different facts in rows of a fact table. In some examples, subsets of the rows of a fact table 112 are stored by a shard, which is a set of nodes 104A-N storing the same data.

The example portions 106A-N, the example fact table 112, and the example dimension table 110 may be stored on any number and/or type(s) of computer-readable storage device(s) and/or disk(s) using any number and/or type(s) of data structure(s).

To query the database data 102, the example nodes 104A of FIG. 1 include an example querier 114. For each request 116 to query the database data 102, one of the example queriers 114 (e.g., the querier 114 associated with the node 104A) is a coordinator for the request 116. An example SQL query that can be included in the request 116 is:
    SELECT D.Msg, AVG(F.s) As Average
    FROM Alert As F INNER JOIN Rule As D ON
        (F.DSIDSigID=D.ID)
    WHERE D.class=<filter>
    GROUP BY D.Msg In the illustrated example, the querier 114 of the node 104A, which is acting as the coordinator, forms (e.g., defines, generates, etc.) sub-queries 120B, 120C, . . . 120N to be executed by the queriers 114 of respective nodes 104B-N. In some examples, the coordinator forms a sub-query 120A to be executed by the coordinator (i.e., the querier 114 of node 104A). The example coordinator forms a sub-query 120A-N for each node 104A-N, which may be the same, that stores a portion 106A-N of the database data related to the request 116. Example SQL sub-queries 120A-N are:
    SELECT D.Msg, SUM(F.s) As Sum, COUNT(F.s) As
        Count
    FROM Alert As F INNER JOIN Rule As D ON
        (F.DSIDSigID=D.ID)
    WHERE D.class=<filter>
    GROUP BY D.Msg The queries shown above are illustrative examples of queries that may be performed to populate the example dashboard 130 of FIG. 2. In these examples, the table Alert is an F (partition-able) table (which is a Fact table) than needs to be joined with Rule (which is a Dimension table). The result of the example query 116 is the average volume (F.s) of messages per type (D.Msg). The query 116 is the high-level query sent to the database coordinator 118. The example sub-queries 120A-N represents the intermediate calculations done by each node 104A-N before final aggregation. The example queriers 114 execute their sub-query 120A-N, and return responses 122A, 122B, 122C, . . . 122N to the coordinator containing the result(s) of their sub-query 120A-N. Because the database data 102 is separated into horizontally-partitioned fact tables and dimension tables, database data 102 does not need to be reshuffled (e.g., moved between nodes 104A-N) to perform the sub-queries 120A-N. By eliminating reshuffling, the sub-queries 120A-N are linearly scalable and, thus, the overall query request 116 can be performed in real-time. Moreover, the aggregation of data can be changed after the database data 102 has been partitioned.

The example coordinator of FIG. 1 combines the results of the sub-queries 120A-N to form a response 124 to the request 116 containing the result(s) of the query contained in the request 116. Assuming the results of the sub-queries 120A-N have been combined into MapResults, an example SQL command that may be executed by the coordinator to reduce the results of the sub-queries 120A-N (e.g., remove redundant entries) is:
    SELECT Msg, SUM(Count)/SUM(sum) As Average
    FROM MapResults
    GROUP BY Msg The example API 132 sends a query 116 to the designated coordinator 118 (e.g., one of the queriers 114). The coordinator 118 performs three actions: (1) determine what nodes need to participate in the resolution of the query 116; (2) creates sub-queries 120A-N, which may be the same, to be computed locally on each participating node 104A-N; and (3) consolidates the individual results 122A-N into a single result set. The determination of the participating nodes is done by, for example, observing the sharding key values resulting from the WHERE condition of the example query 116. If no sharding key is provided as part of the WHERE condition, then one replica of each shard participates in the query 116 (e.g., all shards participates. If a set of sharding key-values is provided as part of the WHERE condition, then the knowledge of what shards manage those key-values is used to determine to what shards to send each sub-query 120A-N. The creation of the sub-queries 120A-N includes translation of aggregate functions and, if sharding key-values are present, filtering criteria segregated per node 104A-N according to the data managed by each shard. The translation is implemented by, for example, mapping one high-level aggregate function (e.g., from the example AVG(s)) to one or more lower level aggregate functions to be computed in the sub-queries 120A-N (e.g., COUNT(F.s) and SUM(F.s) in the illustrated example). The filtering conditions, if present, are inserted for the data range managed by each shard (the example sub-queries 120A-N shown above do not use sharding keys). The data shuffling inherent in known distributed JOIN operations is not required in the examples disclosed herein, at least because facts (e.g., alerts) are partitioned and dimensions (e.g., rules) are replicated. This obviates the need to provide either the facts or the dimensions over a network to ensure all combinations of facts and dimensions can be considered during a JOIN operation.

In some examples, the coordinator identifies whether any nodes 104B-N fail to respond to the sub-queries 120B-N. If/when a node 104B-N fails to respond, the coordinator stores a handoff hint in a hints directory 134 on the affected node 104B-N for handling by cluster management processes.

Figure 2:
FIG. 2 is an example dashboard for the example system of FIG. 1.

In the illustrated example of FIG. 1, a user e.g., a SIEM security operations center analyst) uses an example client application 126 executing on, for example, an example client device 128 to interact with the cluster 103. For example, the example client application 126 of FIG. 1 may be used to generate and send requests 116, and process the query results for those requests 116 received in responses 122 to populate, update, etc. the contents of an example dashboard 130. An example dashboard 130 is shown in FIG. 2. The example dashboard 130 of FIG. 2 includes an example graph 202 depicting the numbers of security related events associated with different event types that have been received, an example graph 204 showing a time distribution of security related events reception, etc. The example client application 126 maintains the dashboard 130 by sending query requests 116 to collect the database data 102 necessary to update and maintain the graphs 202, 204 shown in the dashboard 130. The example processor platform 500 of FIG. 5 may be used to the implement the example client device 128.

To enable the client application 126 to communicate with the nodes 104A-N, the example client application 126 of FIG. 1 includes an example application programming interface (API) 132. The example API 132 of FIG. 1 enables the client application 126 to communicate with the cluster 103 using SQL operations that are translated to, for example, Apache Thrift-based interfaces implemented by the nodes 104A-N. Additionally, the API 132 applies one or more policies to select a coordinator for a request 116. For example, the API 132 may be aware of the topology of the cluster 103 formed by the nodes 104A-N, and route the request 116 to the closest node 104A-N according to the database data that is being requested.

While an example manner of implementing the partitioned database system 100 is illustrated in FIG. 1, one or more of the elements, processes and/or devices illustrated in FIG. 1 may be combined, divided, re-arranged, omitted, eliminated and/or implemented in any other way. Further, the example nodes 104A-N, the example portions 106A-N, the example data director 108, the example dimension tables 110, the example facts table 112, the example queriers 114, the example coordinator, the example client application 126, the example API 132, and/or, more generally, the example system 100 of FIG. 1 may be implemented by hardware, software, firmware and/or any combination of hardware, software and/or firmware. Thus, for example, any of the example nodes 104A-N, the example portions 106A-N, the example data director 108, the example dimension tables 110, the example facts table 112, the example queriers 114, the example coordinator, the example client application 126, the example API 132, and/or, more generally, the example system 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example nodes 104A-N, the example portions 106A-N, the example data director 108, the example dimension tables 110, the example facts table 112, the example queriers 114, the example coordinator, the example client application 126, the example API 132, and the example system 100 is/are hereby expressly defined to include a non-transitory computer-readable storage device or storage disk such as a memory, a digital versatile disc (DVD), a compact disc (CD), a Blu-ray disc, etc. including the software and/or firmware. Further still, the example system 100 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
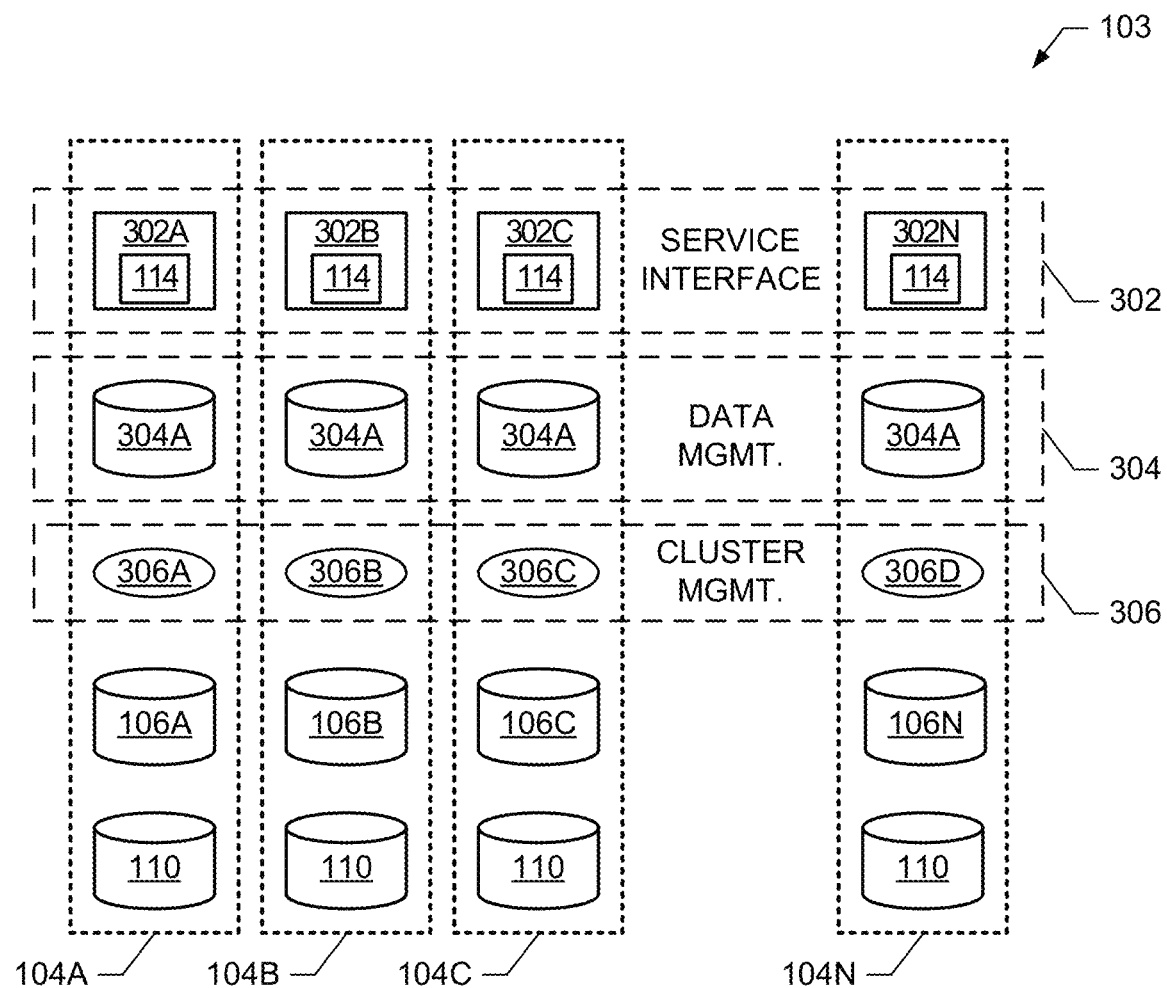
FIG. 3 is a block diagram illustrating an example implementation for the example cluster and the example nodes of FIG. 1.

FIG. 3 is a block diagram illustrating an example implementation for the example cluster 103 and the example nodes 104A-N of FIG. 1. To provide an interface to the example nodes 104A-N, the example nodes 104A-N of FIG. 3 include an example respective example service interface module 302A, 302B, 302C, . . . 302N. The example service interface modules 302A-N of FIG. 3 form a distributed service interface layer 302 for the cluster 103 that provides a common interface for the client application 126 to query the portions 106A-N. The example distributed service layer 302 of FIG. 3 enables the client application 126 to query the cluster 103 as if it is a single database node. For example, the client application 126 can send a single query request 116 that gets decomposed into sub-queries 120A-N for execution by the nodes 104A-N, without the client application 126 needing to be aware of how the database data 102 is partitioned. To query the portions 106A-N, the example service interface modules 302A-N include a respective example querier 114.

In the illustrated example of FIG. 3, the distributed service layer 302 maintains information regarding the current processing loads of the nodes 104A-N, and distances between the nodes 104A-N in terms of experienced latency, which may not be consistent with network topology, identifies which nodes 104B-N are operational, parses query requests 116 to identify which nodes 104B-N should receive each sub-query 120B-N, and merges the results before sending the query results to the client application 126.

To manage data persistency, the example nodes 104A-N of FIG. 3 include a respective example data management module 304A, 304B, 304C, . . . 304N. The example data management modules 304A-N of FIG. 3 form a data management layer 304 for the cluster 103. The example data management layer 304 of FIG. 3 maintains durable system state information for the database data 102 stored in the portions 106A-N, and makes any necessary durable changes to the portions 106A-N.

To manage the cluster 103, the example nodes 104A-N of FIG. 3 include a respective example cluster management module 306A, 306B, 306C, . . . 306N. The example cluster management modules 306A-N of FIG. 3 form a cluster management layer 306 for the cluster 103. The example cluster management layer 306 of FIG. 3 ensures long term consistency of the cluster 103, e.g., by checking portions 106A-N (e.g., fact tables 112) and dimension tables 110 for internal consistency, running data repair processes when inconsistencies are identified, allowing empty nodes to be introduced in the cluster 103, allowing a node to leave the cluster 103 (e.g., be decommissioned), re-balancing data across shards, allowing a node that has been outside the cluster for a period of time to be re-introduced, etc.

While an example manner of implementing the example cluster 103 and the example nodes 104A-N of FIG. 1 is illustrated in FIG. 3, one or more of the elements, processes and/or devices illustrated in FIG. 3 may be combined, divided, re-arranged, omitted, eliminated and/or implemented in any other way. Further, the example service interface modules 302A-N, the example service interface layer 302, the example data management modules 304A-N, the example data management layer 304, the example cluster management modules 306A-N, the example cluster management layer 306, and/or, more generally, the example nodes 104A-N and the example cluster 103 of FIG. 3 may be implemented by hardware, software, firmware and/or any combination of hardware, software and/or firmware. Thus, for example, any of the example service interface modules 302A-N, the example service interface layer 302, the example data management modules 304A-N, the example data management layer 304, the example cluster management modules 306A-N, the example cluster management layer 306, and/or, more generally, the example nodes 104A-N and the example cluster 103 of FIG. 3 could be implemented by one or more analog or digital circuit(s), logic circuits, programmable processor(s), programmable controller(s), GPU(s), DSP(s), ASIC(s), PLD(s) and/or FPLD(s). When reading any of the apparatus or system claims of this patent to cover a purely software and/or firmware implementation, at least one of the example service interface modules 302A-N, the example service interface layer 302, the example data management modules 304A-N, the example data management layer 304, the example cluster management modules 306A-N, the example cluster management layer 306, the example nodes 104A-N, and the example cluster 103 of FIG. 3 is/are hereby expressly defined to include a non-transitory computer-readable storage device or storage disk such as a memory, a DVD, a CD, a Blu-ray disc, etc. including the software and/or firmware. Further still, the example nodes 104A-N and the example cluster 103 of FIG. 1 may include one or more elements, processes and/or devices in addition to, or instead of, those illustrated in FIG. 3, and/or may include more than one of any or all of the illustrated elements, processes and devices.

Figure 4:
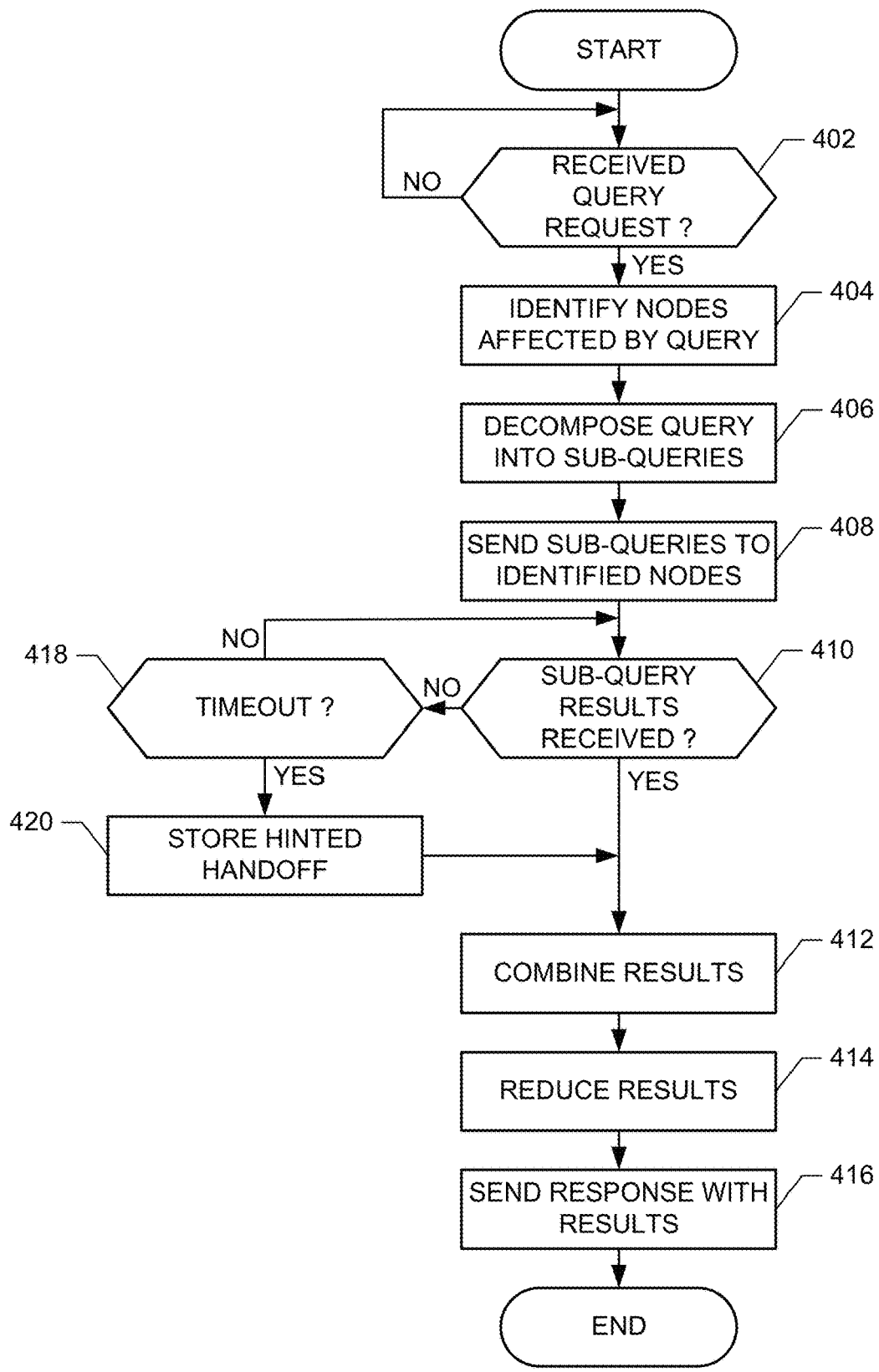
FIG. 4 is a flowchart representative of example hardware logic or machine-readable instructions for implementing the example nodes, and/or, more generally, the example cluster of FIG. 1.

A flowchart representative of example hardware logic or machine-readable instructions for implementing the example nodes 104A-N, and/or, more generally, the example cluster 130 of FIGS. 1 and 3 is shown in FIG. 4. The machine-readable instructions may be a program or portion of a program for execution by a processor such as the processor 510 shown in the example processor platform 500 discussed below in connection with FIG. 5. The program may be embodied in software stored on a non-transitory computer-readable storage medium such as a compact disc read-only memory (CD-ROM), a floppy disk, a hard drive, a DVD, a Blu-ray disk, or a memory associated with the processor 510, but the entire program and/or parts thereof could alternatively be executed by a device other than the processor 510 and/or embodied in firmware or dedicated hardware. Further, although the example program is described with reference to the flowchart illustrated in FIG. 4, many other methods of implementing the example cluster 103 and the example nodes 104A-N may alternatively be used. For example, the order of execution of the blocks may be changed, and/or some of the blocks described may be changed, eliminated, or combined. Additionally, and/or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example process of FIG. 4 may be implemented using executable instructions (e.g., computer and/or machine-readable instructions) stored on a non-transitory computer and/or machine-readable medium such as a hard disk drive, a flash memory, a read-only memory, a CD-ROM, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer-readable medium is expressly defined to include any type of computer-readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

The program of FIG. 4 begins at block 402, where the cluster 103 waits to receive a query request 116 from a client application 126. When a query request 116 is received at a first of the nodes 104A-N acting as a coordinator for the query request 116 (block 402), the coordinator identifies the nodes 104A-N affected by the query request 116 (block 404). The coordinator decomposes the query request 116 into sub-queries 120A-N (block 406), and sends the sub-queries 120A-N to the identified nodes 104A-N (block 408).

The coordinator waits to receive results 122A-N for the sub-queries 120A-N from the identified nodes 104A-N (block 410). When the results 122A-N have been received (block 410), the coordinator combines the results (block 412) and reduces the results to, for example, remove redundant data (block 414). The coordinator sends a response 124 with the results to the client application 126 (block 416), and control exits from the example program of FIG. 4.

Returning to block 410, when not all sub-query results 122A-N have been received (block 410), the coordinator determines whether a timeout has occurred (block 418). If a timeout has not occurred (block 418), the coordinator continues to wait for sub-query results 122A-N (block 410). If a timeout has occurred (block 418), the coordinator stores a hinted handoff notice for the node(s) 104A-N from which sub-query results 122A-N have not been received (block 420), and control proceeds to block 412 to combine the sub-query results 122A-N that were received.

Figure 5:
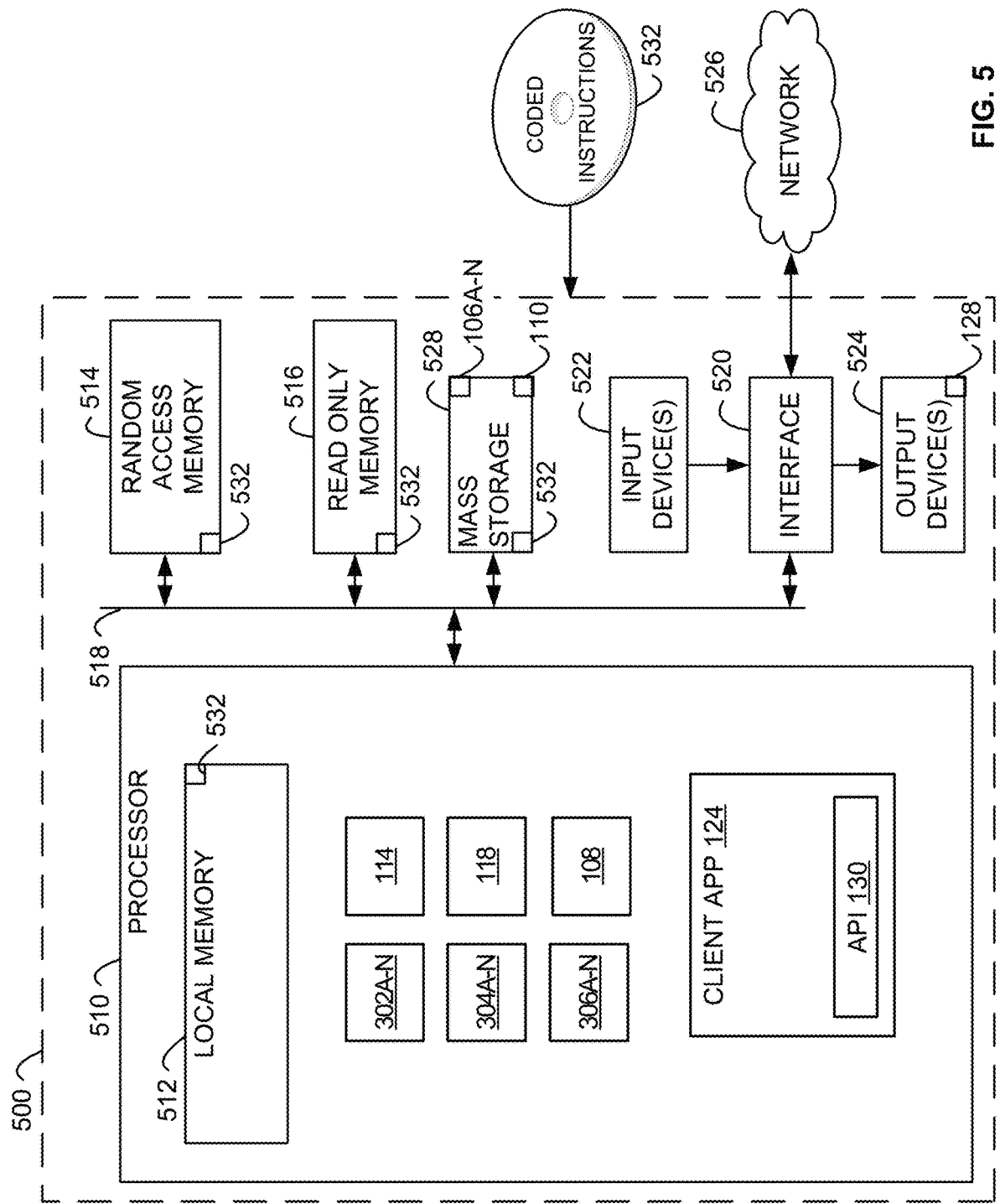
FIG. 5 illustrates an example processor platform structured to execute the example machine-readable instructions of FIG. 4 to implement the example nodes, and/or, more generally, the example cluster of FIG. 1.

FIG. 5 is a block diagram of an example processor platform 500 structured to execute the instructions of FIG. 4 to implement the cluster 103 and nodes 104A-N of FIGS. 1 and 3. The processor platform 500 can be, for example, a server, a personal computer, a workstation, or any other type of computing device.

The processor platform 500 of the illustrated example includes a processor 510. The processor 510 of the illustrated example is hardware. For example, the processor 510 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example queriers 114, the example coordinator, the example service interface modules 302A-N, the example data management modules 304A-N, the example cluster management modules 306A-N, the example data director 108, the example client application 126, the example API 132.

The processor 510 of the illustrated example includes a local memory 512 (e.g., a cache). The processor 510 of the illustrated example is in communication with a main memory including a volatile memory 514 and a non-volatile memory 516 via a bus 518. The volatile memory 514 may be implemented by Synchronous Dynamic Random-Access Memory (SDRAM), Dynamic Random-Access Memory (DRAM), RAMBUS® Dynamic Random-Access Memory (RDRAM®) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a PCI express interface.

In the illustrated example, one or more input devices 522 are connected to the interface circuit 520. The input device(s) 522 permit(s) a user to enter data and/or commands into the processor 510. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc), a tactile output device, a printer and/or speaker. The interface circuit 520 of the illustrated example, thus, typically includes a graphics driver card, a graphics driver chip and/or a graphics driver processor. The example dashboard 130 may be displayed on an output device 524

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc. In some examples of a Wi-Fi system, the interface circuit 520 includes a radio frequency (RF) module, antenna(s), amplifiers, filters, modulators, etc.

The processor platform 500 of the illustrated example also includes one or more mass storage devices 528 for storing software and/or data. Examples of such mass storage devices 528 include floppy disk drives, hard drive disks, CD drives, Blu-ray disc drives, redundant array of independent disks (RAID) systems, and DVD drives. In the illustrated example, the example portions 106A-N, the example fact table 112, and the example dimension table 110 are stored on the mass storage device 528.

Coded instructions 532 including the coded instructions of FIG. 4 may be stored in the mass storage device 528, in the volatile memory 514, in the non-volatile memory 516, and/or on a removable non-transitory computer-readable storage medium such as a CD-ROM or a DVD.

From the foregoing, it will be appreciated that example systems, methods, apparatus and articles of manufacture have been disclosed that aggregate partitioned database data. From the foregoing, it will be appreciated that methods, apparatus and articles of manufacture have been disclosed that make computer operations more efficient by being able to aggregate partitioned database data. Thus, through use of teachings of this disclosure, computers can operate more efficiently by being able to process database data in real-time at rates that are currently infeasible.

Example methods, systems, apparatus, and articles of manufacture to aggregate partitioned database data are disclosed herein. Further examples and combinations thereof include at least the following.

Example 1 is a partitioned database system that includes:
a plurality of nodes;
a data director to distribute a plurality of portions of database data across the plurality of nodes, the plurality of portions distributed according to a pattern not based on data content;
queriers associated with respective ones of the plurality of nodes, the queriers to execute respective sub-queries of respective portions of the database data; and
a coordinator to:
receive a request to query the database data; and
merge results of the plurality of sub-queries to form a response to the request.

Example 2 is the partitioned database system of example 1, wherein at least some of the nodes store their respective portions of the database data in a horizontally-arranged fact table.

Example 3 is the partitioned database system of any of examples 1 to 2, wherein the pattern is at least one of a rotating pattern, or a random pattern.

Example 4 is the partitioned database system of any of examples 1 to 3, wherein the queriers implement a distributed interface, the distributed interface to monitor a topology of storage devices associated with the nodes, and a real-time status of the partitioned database system.

Example 5 is the partitioned database system of any of examples 1 to 4, wherein a first of the queriers is to perform the respective sub-query without a shuffle of the respective portion of the database data.

Example 6 is the partitioned database system of any of examples 1 to 5, wherein a first of the sub-queries is a linearly-scalable query.

Example 7 is the partitioned database system of any of examples 1 to 6, wherein the coordinator is a first of the queriers, and the coordinator is to:
form the sub-queries based on the request; and
send the sub-queries to others of the queriers.

Example 8 is the partitioned database system of example 7, wherein the first of the queriers is to decompose the request to form the sub-queries.

Example 9 is the partitioned database system of any of examples 1 to 8, wherein the request is received from a client application.

Example 10 is method that includes:
distributing respective portions of database data across a plurality of nodes;
decomposing a request to query the database data, by executing an instruction with at least one processor, to form a plurality of sub-queries of respective portions of the database data;
executing the sub-queries on respective ones of the nodes; and
combining results of the plurality of sub-queries, by executing an instruction with at least one processor, to form a response to the request.

Example 11 is the method of example 10, wherein distributing the database data is according to at least one of a rotating pattern, or a random pattern.

Example 12 is the method of any of examples 10 to 11, wherein a first of the sub-queries does not shuffle the respective portion of the database data.

Example 13 is the method of any of examples 10 to 11, wherein a first of the plurality of sub-queries is linearly scalable.

Example 14 is the method of any of examples 10 to 13, wherein receiving the query request and decomposing the query request to form the plurality of sub-queries is performed on a first node of the plurality of nodes, the first node to:
  send the sub-queries to respective ones of the plurality of nodes;
  receive the results of the sub-queries from the respective ones of the nodes; and
  combine the results to form the response.

Example 15 is the method of example 14, wherein combining the results includes merging and reducing the results of the sub-queries.

Example 16 is a non-transitory computer-readable storage medium storing instructions that, when executed, cause a machine to at least:
  decompose a request to query database data to form a plurality of sub-queries of respective portions of the database data, the portions of the database data distributed on respective nodes of a partitioned database system;
  send the sub-queries to respective nodes for execution on respective portions of the database data; and
  combine results of the plurality of sub-queries to form a response to the request.

Example 17 is the non-transitory computer-readable storage medium of example 16, wherein a first of the sub-queries is linearly scalable.

Example 18 is the non-transitory computer-readable storage medium of any of examples 16 to 17, including further instructions that, when executed, cause the machine to combine the results by merging and reducing the results of the sub-queries.

Example 19 is the non-transitory computer-readable storage medium of any of examples 16 to 18, wherein a first of the sub-queries does not shuffle the respective portion of the database data.

Example 20 is the non-transitory computer-readable storage medium of any of examples 16 to 19, wherein a distribution pattern of the database data is not dependent on data content.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A partitioned database system, comprising:
  a plurality of nodes;
  a data director to randomly or pseudo-randomly distribute a plurality of portions of database data across the plurality of nodes without respect to content of the database data;
  queriers associated with respective ones of the plurality of nodes, the queriers to execute respective ones of a plurality of sub-queries of respective portions of the database data; and
  a coordinator to:
    receive a request to query the database data, the request including at least one sharding key value provided as part of a conditional statement;
    generate the plurality of sub-queries based on the at least one sharding key value;
    instruct the queriers to execute the respective ones of the plurality of sub-queries and provide results of the execution of the respective ones of the plurality of sub-queries to the coordinator; and
    merge the results of the plurality of sub-queries to form a response to the request.

2. The partitioned database system of claim 1, wherein at least some of the plurality of nodes are to store their respective portions of the database data in a horizontally-arranged fact table.

3. The partitioned database system of claim 1, wherein the queriers are to implement a distributed interface, the distributed interface to monitor a topology of storage devices associated with the nodes, and a real-time status of the partitioned database system.

4. The partitioned database system of claim 1, wherein a first of the queriers is to perform the respective ones of the plurality of sub-queries without a shuffle of the respective portion of the database data.

5. The partitioned database system of claim 1, wherein a first of the plurality of sub-queries is a linearly-scalable query.

6. The partitioned database system of claim 1, wherein the coordinator is a first of the queriers, and the coordinator is to:
  form the plurality of sub-queries based on the request; and
  send the plurality of sub-queries to others of the queriers.

7. The partitioned database system of claim 6, wherein the first of the queriers is to decompose the request to form the plurality of sub-queries.

8. The partitioned database system of claim 1, wherein the request is received from a client application.

9. A method, comprising:
  randomly or pseudo-randomly distributing respective portions of database data across a plurality of nodes without respect to content of the database data;
  decomposing a request to query the database data, by executing an instruction with at least one processor, to form a plurality of sub-queries of respective portions of the database data based on at least one sharding key value, the request including the at least one sharding key value provided as part of a conditional statement;
  instructing queriers to execute the sub-queries on respective ones of the nodes and provide results of the execution of the respective ones of the plurality of sub-queries; and
  combining results of the plurality of sub-queries, by executing an instruction with at least one processor, to form a response to the request.

10. The method of claim 9, wherein a first of the plurality of sub-queries does not shuffle the respective portion of the database data.

11. The method of claim 9, wherein a first of the plurality of sub-queries is linearly scalable.

12. The method of claim 9, wherein receiving of the query request and decomposing the query request to form the plurality of sub-queries is performed on a first node of the plurality of nodes, the first node to:
  send the sub-queries to respective ones of the plurality of nodes;
  receive the results of the sub-queries from the respective ones of the nodes; and
  combine the results to form the response.

13. The method of claim 9, wherein the combining of the results includes merging and reducing the results of the sub-queries.

14. A non-transitory computer-readable storage medium comprising instructions that, when executed, cause a machine to at least:
- randomly or pseudo-randomly distributing respective portions of database data across a plurality of nodes of a partitioned database without respect to content of the database data;
- decompose a request to query the database data to form a plurality of sub-queries of respective portions of the database data based on at least one sharding key value, the request including the at least one sharding key value provided as part of a conditional statement;
- instruct queriers to execute the sub-queries to respective nodes on respective portions of the database data and provide results of the execution of the respective ones of the plurality of sub-queries; and
- combine results of the plurality of sub-queries to form a response to the request.

15. The non-transitory computer-readable storage medium of claim 14, wherein a first of the sub-queries is linearly scalable.

16. The non-transitory computer-readable storage medium of claim 14, including further instructions that, when executed, cause the machine to combine the results by merging and reducing the results of the sub-queries.

17. The non-transitory computer-readable storage medium of claim 14, wherein a first of the sub-queries does not shuffle the respective portion of the database data.

* * * * *